United States Patent
Nelson et al.

(10) Patent No.: US 9,430,242 B2
(45) Date of Patent: Aug. 30, 2016

(54) THROTTLING INSTRUCTION ISSUE RATE BASED ON UPDATED MOVING AVERAGE TO AVOID SURGES IN DI/DT

(75) Inventors: Peter Michael Nelson, Houston, TX (US); Jack Hilaire Choquette, Palo Alto, CA (US); Olivier Giroux, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 822 days.

(21) Appl. No.: 13/437,765

(22) Filed: Apr. 2, 2012

(65) Prior Publication Data

US 2013/0262831 A1    Oct. 3, 2013

(51) Int. Cl.
| | |
|---|---|
| G06F 9/30 | (2006.01) |
| G06F 9/38 | (2006.01) |
| G06F 1/32 | (2006.01) |
| G06T 1/20 | (2006.01) |
| G06F 1/26 | (2006.01) |
| G06F 1/30 | (2006.01) |

(52) U.S. Cl.
CPC .............. *G06F 9/3836* (2013.01); *G06F 1/26* (2013.01); *G06F 1/305* (2013.01); *G06F 1/3203* (2013.01); *G06F 1/324* (2013.01); *G06F 1/329* (2013.01); *G06F 9/30* (2013.01); *G06F 9/30109* (2013.01); *G06F 9/3851* (2013.01); *G06F 9/3887* (2013.01); *G06T 1/20* (2013.01); *Y02B 60/144* (2013.01)

(58) Field of Classification Search
CPC ........................... G06F 1/3203; G06F 9/3836
See application file for complete search history.

(56) References Cited

U.S. PATENT DOCUMENTS

| | | | | |
|---|---|---|---|---|
| 6,636,976 | B1 * | 10/2003 | Grochowski et al. | 713/320 |
| 2003/0126476 | A1 * | 7/2003 | Greene | 713/300 |
| 2006/0230256 | A1 * | 10/2006 | Chrysos | 712/200 |
| 2008/0133947 | A1 * | 6/2008 | Shimada et al. | 713/320 |
| 2009/0300329 | A1 * | 12/2009 | Naffziger et al. | 712/205 |
| 2011/0125657 | A1 * | 5/2011 | Boss et al. | 705/317 |
| 2012/0254595 | A1 * | 10/2012 | Wu et al. | 712/208 |

* cited by examiner

*Primary Examiner* — Kenneth Kim
(74) *Attorney, Agent, or Firm* — Artegis Law Group, LLP

(57) ABSTRACT

Systems and methods for throttling GPU execution performance to avoid surges in DI/DT. A processor includes one or more execution units coupled to a scheduling unit configured to select instructions for execution by the one or more execution units. The execution units may be connected to one or more decoupling capacitors that store power for the circuits of the execution units. The scheduling unit is configured to throttle the instruction issue rate of the execution units based on a moving average issue rate over a large number of scheduling periods. The number of instructions issued during the current scheduling period is less than or equal to a throttling rate maintained by the scheduling unit that is greater than or equal to a minimum throttling issue rate. The throttling rate is set equal to the moving average plus an offset value at the end of each scheduling period.

20 Claims, 14 Drawing Sheets

THROTTLING INSTRUCTION ISSUE RATE BASED ON UPDATED MOVING AVERAGE TO AVOID SURGES IN DI/DT

BACKGROUND OF THE INVENTION

1. Field of the Invention

The disclosure generally relates to power management, and more specifically to methods and apparatus to avoid surges in DI/DT (rate of change of current) by throttling graphics processing unit (GPU) execution performance.

2. Description of the Related Art

Typically, power supplies for computing devices are switched-mode power supplies (SMPS) that convert a main supply alternating current (AC) power to a direct current (DC) power at one or more voltages using a high frequency switching mechanism. The voltage output of the SMPS may then be regulated by altering the duty cycle of the signal that controls the switching mechanism. The SMPS power supplies typically operate at a frequency between 50 kHz and 1 MHz. A feedback circuit is implemented to control the selected duty cycle used to generate the regulated output voltage, but the feedback circuit cannot compensate for load changes instantaneously. Consequently, varying the load (i.e., current draw) at the output of the power supply will cause a corresponding change in the output voltage before the power supply "reacts" and changes the duty cycle of the control signal.

The power requirements of the computing device attached to the power supply change dynamically based on the operations being performed as well as other factors (such as special power saving configurations of the various processing units). The more operations being performed, the larger the current draw on the power supply. A large surge in current draw causes a corresponding drop in voltage at the output of the power supply (which is then corrected by adjusting the duty cycle of the control signal for the switching mechanism). Conversely, a large drop in current draw will cause a corresponding spike in voltage at the output of the power supply. These changes in voltage supplied to the computing device may have adverse effects on the various components within the computing device. For example, the circuits of a processing unit may include various transistors or memory units (e.g., static RAM or Flip-Flops) that require a threshold voltage in order to operate reliably. When a large surge in current draw causes a corresponding drop in the supply voltage supplied to the circuit, the operation of the components may become unreliable, thereby producing random results. Conversely, a large drop in current draw corresponding to a voltage spike may cause physical harm to certain components.

Conventionally, decoupling capacitors located proximate to the various components of the computing device may provide local storage for a small amount of power that may react to fast changes in current draw instead of relying on the power supply circuit to adjust the duty cycle of the switching mechanism. However, such techniques have some drawbacks. First, adding capacitors to the computing device increases the cost and complexity of the system. These costs and complexities are exacerbated in highly parallel processors, such as graphics processing units, because such processors may have hundreds or thousands of hardware sub-units that each requires separate local capacitance. Second, physical limitations of the chip design may limit the practical amount of capacitance that may be added to a circuit. Capacitors require physical space on a chip and, therefore, increasing the number of capacitors in a design may increase the size of the overall integrated circuit package. The increased size of the IC package results in a lower yield per silicon wafer and a corresponding increase in cost per chip. Finally, adding capacitance to a circuit may change the electrical characteristics of the circuit, thereby requiring longer set-up and hold times for reliable operation of the circuit components. These electrical characteristics may adversely limit the processing capacity of the processor by limiting the clock speed at which the processor may be run.

Accordingly, what is needed in the art is a system and method for throttling computing device performance to reduce large surges in current draw.

SUMMARY OF THE INVENTION

One example embodiment of the disclosure sets forth a method for throttling an instruction issue rate of a processor. The method includes the steps of receiving a plurality instructions to be issued to one or more execution units within the processor and dispatching a subset of instructions included in the plurality instructions to the one or more execution units within a first number of clock cycles during a current scheduling period, where the instruction issue rate during the current scheduling period is less than or equal to a throttling rate for the current scheduling period. The instruction issue rate during the current scheduling period is defined by a number of clock cycles for which at least one instruction is dispatched during the particular scheduling period. The method also includes the steps of updating a moving average based on the instruction issue rate during the current scheduling period and updating a throttling rate for a next scheduling period based on the moving average.

Another example embodiment of the disclosure sets forth a processing unit that includes one or more execution units and including a scheduling unit configured to perform the method set forth above. Yet another example embodiment of the disclosure sets forth a computing device that includes a memory and a processor that includes one or more execution units and including a scheduling unit configured to perform the method set forth above.

BRIEF DESCRIPTION OF THE DRAWINGS

So that the manner in which the above recited features of the present disclosure can be understood in detail, a more particular description, briefly summarized above, may be had by reference to example embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skill in the art that the invention may be practiced without one or more of these specific details.

System Overview

Figure 1:
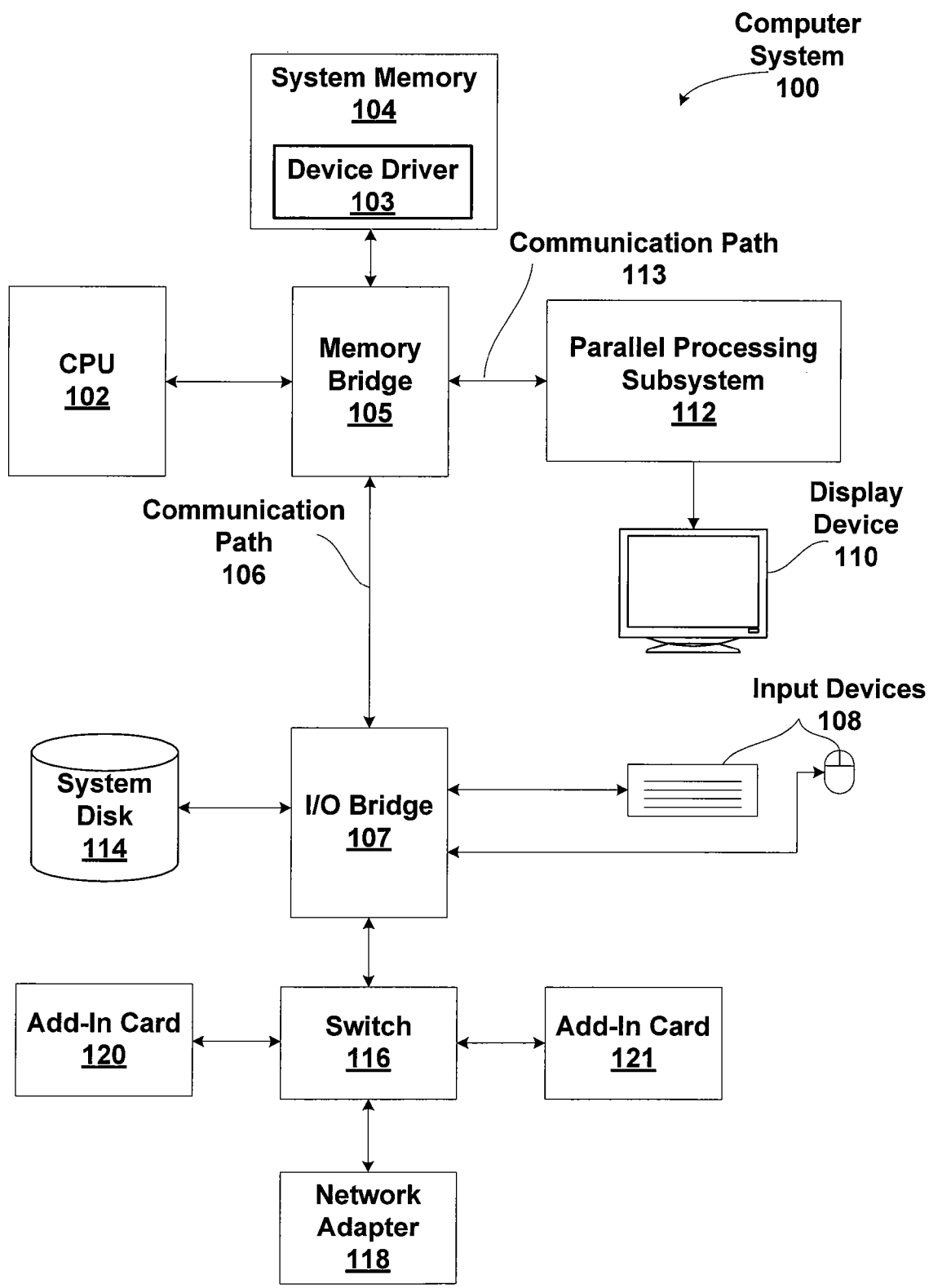
FIG. 1 is a block diagram illustrating a computer system configured to implement one or more aspects of the present disclosure.

FIG. 1 is a block diagram illustrating a computer system 100 configured to implement one or more aspects of the present disclosure. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect Express (PCIe), Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communications paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
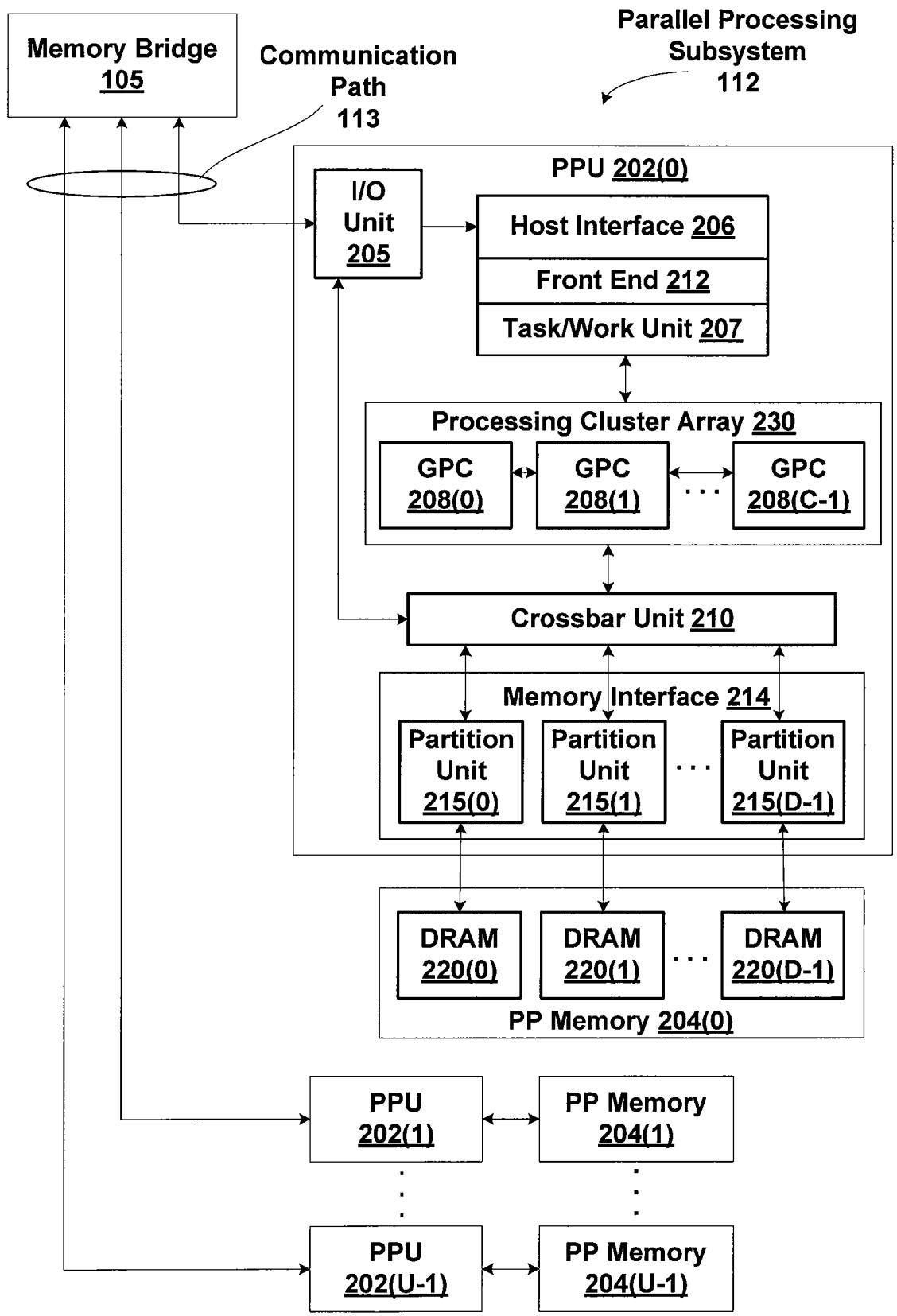
FIG. 2 is a block diagram of a parallel processing subsystem for the computer system of FIG. 1, according to one embodiment of the present disclosure.

FIG. 2 illustrates a parallel processing subsystem 112, according to one embodiment of the present disclosure. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
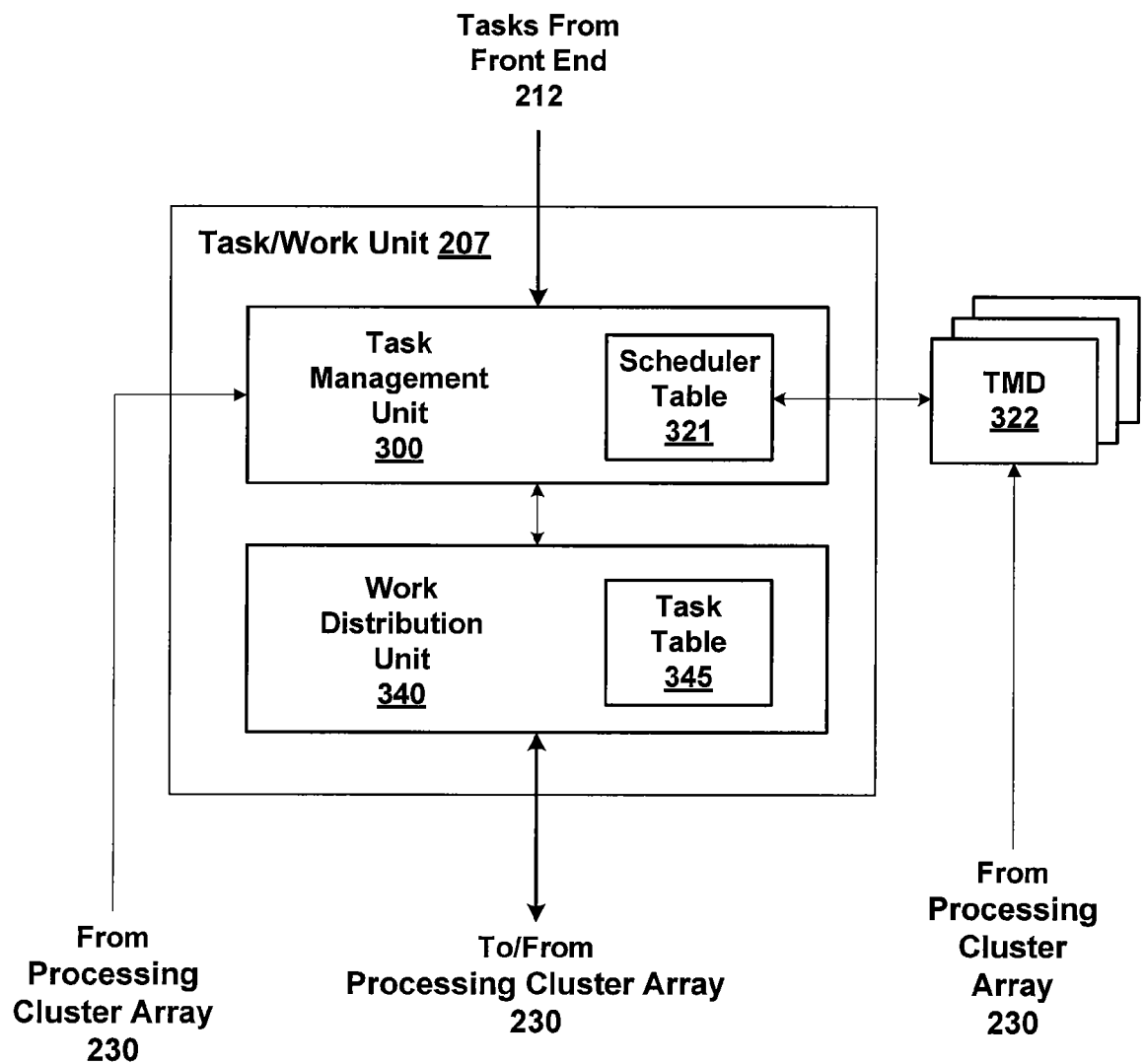
FIG. 3A is a block diagram of the front end of FIG. 2, according to one embodiment of the present disclosure.

FIG. 3A is a block diagram of the task/work unit 207 of FIG. 2, according to one embodiment of the present disclosure. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
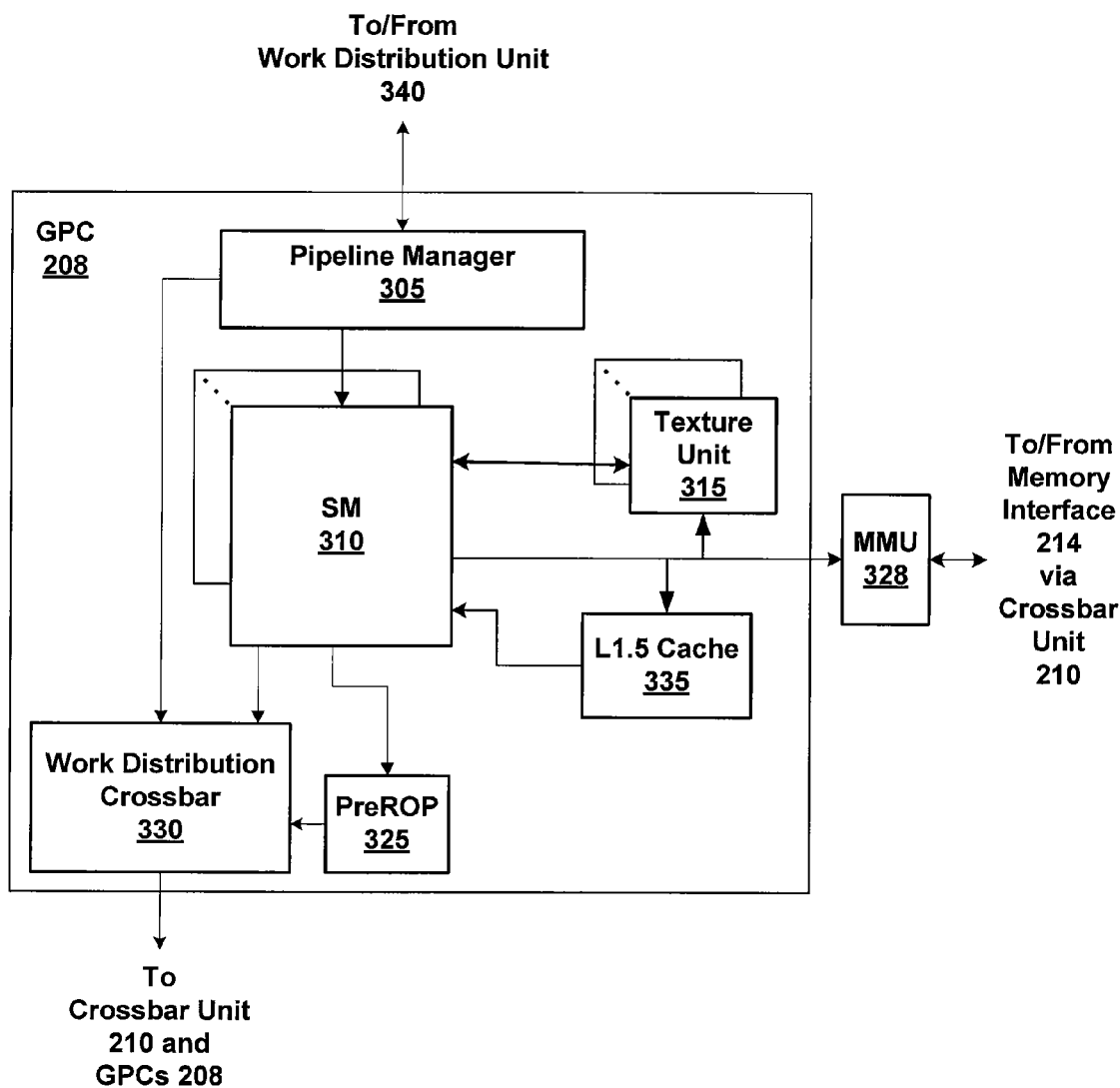
FIG. 3B is a block diagram of a general processing cluster within one of the parallel processing units of FIG. 2, according to one embodiment of the present disclosure.

FIG. 3B is a block diagram of a GPC 208 within one of the PPUs 202 of FIG. 2, according to one embodiment of the present disclosure. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
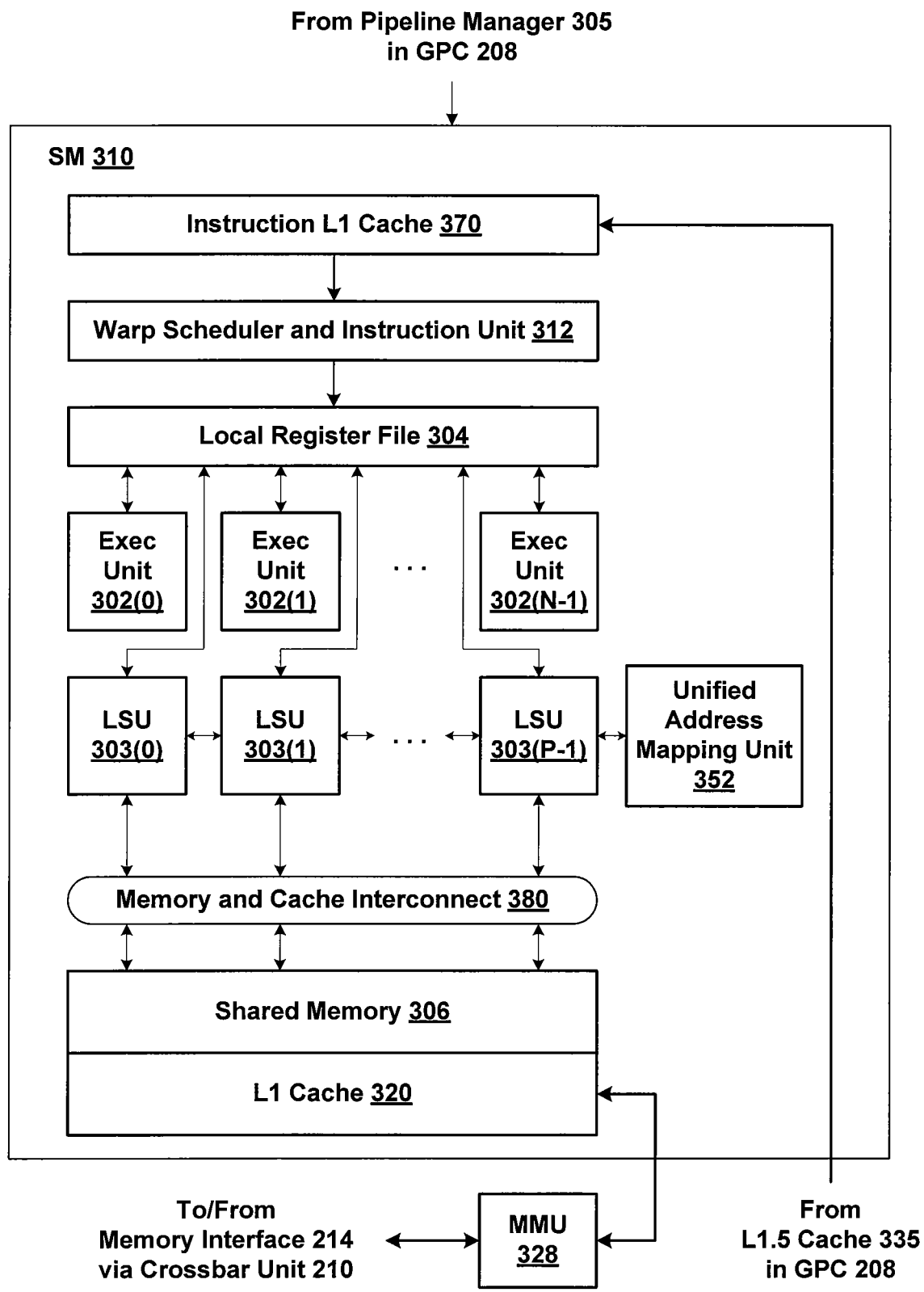
FIG. 3C is a block diagram of a portion of the streaming multiprocessor of FIG. 3B, according to one embodiment of the present disclosure.

FIG. 3C is a block diagram of the SM 310 of FIG. 3B, according to one embodiment of the present disclosure. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Instruction Throttling

Each SM 310 requires power to control the circuit elements that make up each of the hardware subunits within SM 310. The required power changes dynamically based on the operations being performed by SM 310. Each change to a gate voltage of a transistor or each transition of a Flip-Flop requires some small amount of current. Further, the circuit elements that comprise SM 310 are not ideal and experience some incremental current leakage that must be supplied by the power supply of SM 310. Warp scheduler and instruction unit 312 may be configured to throttle the issue rate of instructions being dispatched on the functional execution units of SM 310 to help control the current draw of SM 310. This power management function allows a system designer to provide a lower supply voltage power source that has a smaller voltage overhead, thereby decreasing energy consumption. Alternatively, the power management function may allow SM 310 to be operated at a higher clock frequency due to shorter set-up and hold times associated with a lower supply voltage, thereby increasing processing capacity. One implementation of the power management function is described below in conjunction with FIGS. 4-7.

Figure 4:
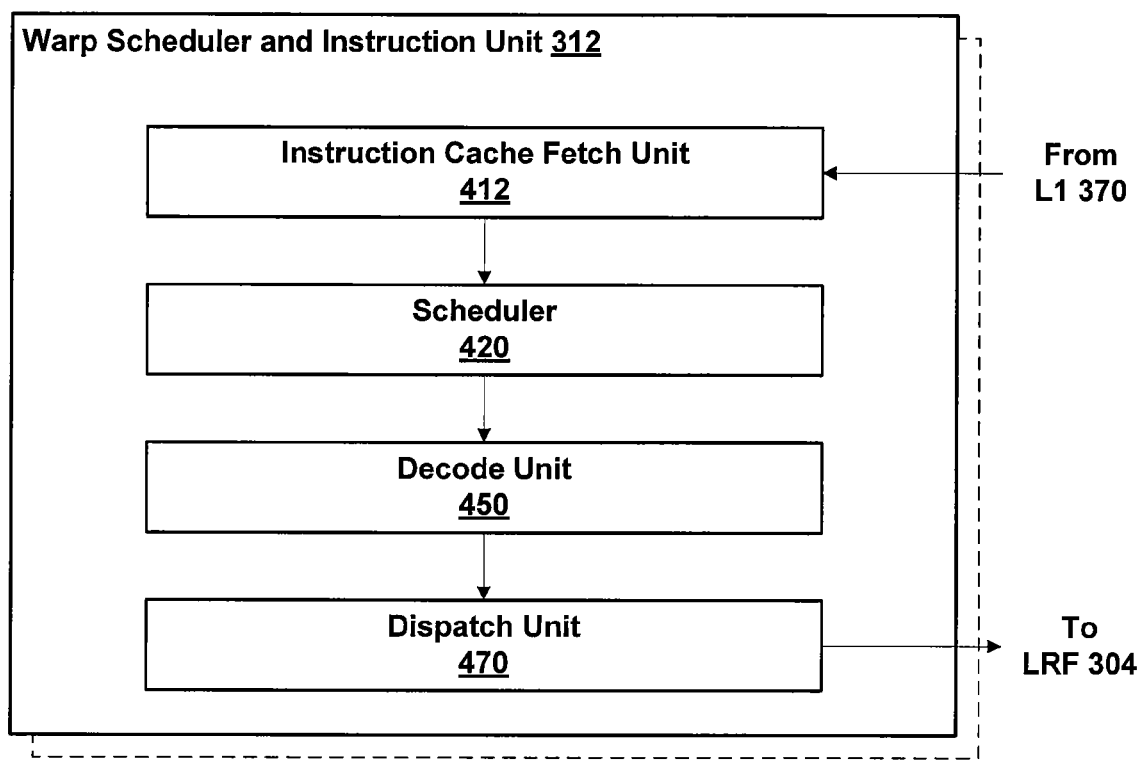
FIG. 4 is a block diagram of the warp scheduler and instruction unit of FIG. 3C, according to one example embodiment of the present disclosure.

FIG. 4 is a block diagram of the warp scheduler and instruction unit 312 of FIG. 3C, according to one example embodiment of the present disclosure. The warp scheduler and instruction unit 312 is configured to manage scheduling of individual instructions on each of the functional execution units of SM 310. In one embodiment, each SM 310 may include one or more warp scheduler and instruction units 312, with each distinct warp scheduler and instruction unit 312 coupled to one or more functional execution units. As shown in FIG. 4, the warp scheduler and instruction unit 312 includes an instruction cache fetch unit 412, a scheduler unit 420, a decode unit 450, and a dispatch unit 470. The instruction cache fetch unit 412 is configured to fetch cache lines containing the instructions for the warps assigned to SM 310 from the instruction L1 cache 370. In one embodiment, each cache line is 512 bits wide, storing eight instructions (64 bits wide) in a single cache line. The instruction cache fetch unit 412 routes instructions fetched from the instruction L1 cache 370 to the scheduler unit 420 for scheduling the instructions on the various functional execution units of SM 310.

An SM 310 may be assigned a plurality of warps for concurrent execution. Scheduler unit 420 determines which warps to execute during the next clock cycle. In one embodiment, scheduler unit 420 maintains a priority associated with each of the warps assigned to SM 310 and schedules instructions for execution on the functional execution units (e.g., exec units 302 and LSUs 303) based on the priorities. For example, scheduler unit 420 may maintain a 6-bit, an 8-bit, or a 10-bit priority value associated with each of 16 different warps assigned to SM 310 at any given time. The priority value may be assigned based on various factors. A priority value may be based on when the warp was scheduled on SM 310 by task/work unit 207 (e.g., the longest pending warp may have the highest priority). In other embodiments, other priority schemes may be adopted, such as by basing the priority value, at least partially, on scheduling hints determined by the compiler within device driver 103. Scheduler unit 420 issues the next instruction selected for execution to decode unit 450. In alternative embodiments, scheduler unit 420 may issue instructions from two or more separate warps during the same clock cycle (e.g., dual-issue, quad-issue, etc.), where each instruction is issued to a subset of the functional execution units associated with the scheduler unit 420.

The decode unit 450 decodes the next instruction and transmits the decoded instruction to the dispatch unit 470. Again, in some embodiments, multiple instructions may be issued during the same clock cycle by one or more separate and distinct warp scheduler and instruction units 312 within SM 310. Dispatch unit 470 implements a FIFO and writes the decoded values to local register file 304 for execution by execution units 302 or load/store units 303. Although decode unit 450 is shown in FIG. 4 as receiving instructions from scheduler unit 420, where scheduling may be implemented prior to performing a decode of the instruction, in alternative embodiments, decode unit 450 may receive instructions directly from instruction cache fetch unit 412, decode the instructions, and transmit the decoded instruction data to scheduler unit 420 for scheduling.

In one embodiment, scheduler unit 420 is configured to control the frequency that instructions are dispatched to the execution units of SM 310. For example, during a given clock cycle, scheduler unit 420 may cause dispatch unit 470 to write data to LRF 304 to be processed by one or more of the functional execution units. The data is processed and results are written back into LRF 304 or directly to shared memory 306 or L1 cache 320. The switching of transistors within the various hardware units of SM 310 to perform such operations requires current, which increases the load on the power supplied to SM 310. During other clock cycles, scheduler unit 420 may stall execution of the functional units and reduce the amount of power consumed by SM 310 during those clock cycles, by not scheduling any instructions during that clock cycle. By choosing when to schedule instructions, scheduler unit 420 may effectively throttle GPU performance to prevent surges in current draw caused by the SM 310 transitioning from idle to full processing capacity in a short time period.

Figure 5A:
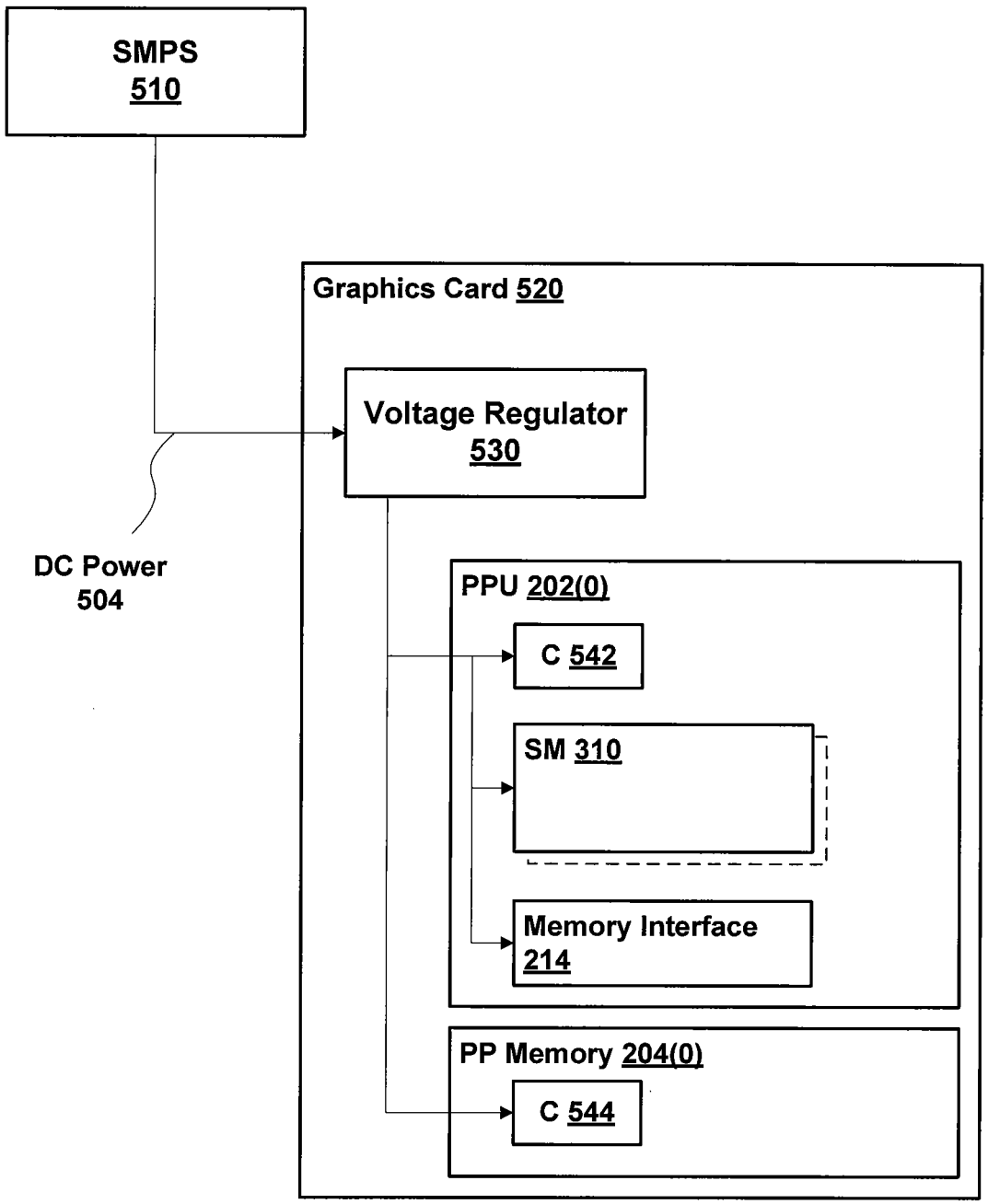
FIG. 5A illustrates power distribution within the computer system, according to one example embodiment of the present disclosure.

FIG. 5A illustrates power distribution within the computer system 100, according to one example embodiment of the present disclosure. As shown in FIG. 5A, computer system 100 includes a switched-mode power supply (SPMS) 510. The SPMS 510 is coupled to a mains AC power such as the United States' common residential power supply at 120 VAC and 60 Hz frequency. The SPMS 510 converts the AC power to one or more DC power supplies 504 that are provided to the various components of computer system 100. In one embodiment, parallel processing subsystem 112 comprises a discrete graphics card 520 that includes a voltage regulator 530, a PPU 202(0) and a PP memory 204(0). The graphics card 520 may be coupled to CPU 102 and SMPS 510 via a graphics bus (e.g., communications path 113) that includes DC power 504 as well as one or more communications paths. For example, graphics card 520 may conform to a PCIe form factor that includes a +12 VDC main power supply and a +3.3 VDC secondary power supply.

DC power 504 is coupled to a voltage regulator 530 that switches power to the various components of graphics card 520. In one embodiment, voltage regulator 530 converts the +12 VDC main power supply to a stepped down power supply at a lower and stable voltage, such as +5 VDC. In another embodiment, voltage regulator 530 may pass the +3.3 VDC secondary voltage supply to the electrical components through an electronically controlled switch such that the various components of the graphics card 520 may be turned on or off by CPU 102, independent of whether DC power 504 is on or off. In yet another embodiment, voltage regulator 530 may include an electrical charge storage element such as a capacitor or inductor and/or a filter element to reduce any electrical noise in the DC signal passed to the electrical components of graphics card 520. Voltage regulator 530 is coupled to each of the components of graphics card 520 to provide power to run the components.

As shown in FIG. 5A, PPU 202(0) and PP memory 204(0) include decoupling capacitors 542 and 544 that are connected to the DC output of voltage regulator 530. Although not shown explicitly in FIG. 5A, capacitors 542 and 544 include a first conductor coupled to the DC output of voltage regulator 530 and a second conductor coupled to ground, where the first conductor and second conductor are separated by a dielectric. The DC output of voltage regulator 530 may also be coupled to the components of PPU 202(0) such as one or more SMs 310 and memory interface 214. It will be appreciated that not all components of PPU 202(0) are shown explicitly in FIG. 5A to avoid obscuring the disclosure.

Capacitors such as C 542 and C 544 may be added to various components to compensate for varying electrical loads and to compensate for varying electrical supply. For example, DC power 504 may include a slight ripple at a frequency of 60 Hz due to rectifying the AC supply voltage, which does not completely remove the AC current from DC power 504. In addition, surges in load from other components can cause a voltage drop in DC power 504, which may be compensated by draining capacitors 542 or 544 as needed. In one embodiment, capacitors 542 and 544 are decoupling capacitors structurally attached to the printed circuit board (PCB) connecting each of the components of graphics card 520, where capacitors 542 and 544 are placed proximate to the integrated circuit (IC) packages of PPU 202(0) and PP memory 204(0), respectively. Capacitors 542 and 544 may be ceramic capacitors of a particular size specified based on the electrical characteristics of PPU 202(0) and PP memory 204(0). In alternative embodiments, capacitors 542 and 544 may be metal oxide semiconductor (MOS) capacitors formed on the substrate of the IC.

It will be appreciated that the effectiveness of the decoupling capacitor is dependent the capacitance of the decoupling capacitors as well as the line inductance and series resistance of the interconnects between the decoupling capacitors and the decoupled circuit. The larger the distance between the capacitor and the circuit, the larger the inductance and the less effective the capacitor will be at handling transient loads produced by the circuit. If the capacitance is ineffective, then the voltage level of DC power 504 is required to include an overhead above a threshold voltage required by the particular load. For example, SM 310 may require a minimum voltage of 3.0 VDC in order to operate reliably. If the capacitor 542 is merely a ceramic capacitor placed next to the IC package for PPU 202(0), then DC power 504 may be capable of dropping 0.2 VDC at the supply of SM 310 due to transient load requirements caused by dynamic operations performed by SM 310. Therefore, DC power 504 must be supplied by SMPS 510 at a minimum of 3.2 VDC. The higher the supply voltage, the larger the energy consumption, which could drain batteries of notebook computers faster, for example. In contrast, if each component of PPU 202(0) implements one or more decoupling capacitors directly on the chip, decreasing the inductance between the decoupling capacitor and the decoupled circuit, the required voltage overhead may be 0.08 VDC, allowing DC power 504 to be supplied at a minimum 3.08 VDC, thereby reducing power consumption of computer system 100. Furthermore, lower operating voltages may allow the processing units to be operated at a higher frequency, thereby increasing the processing capacity of the processing units.

Figure 5B:
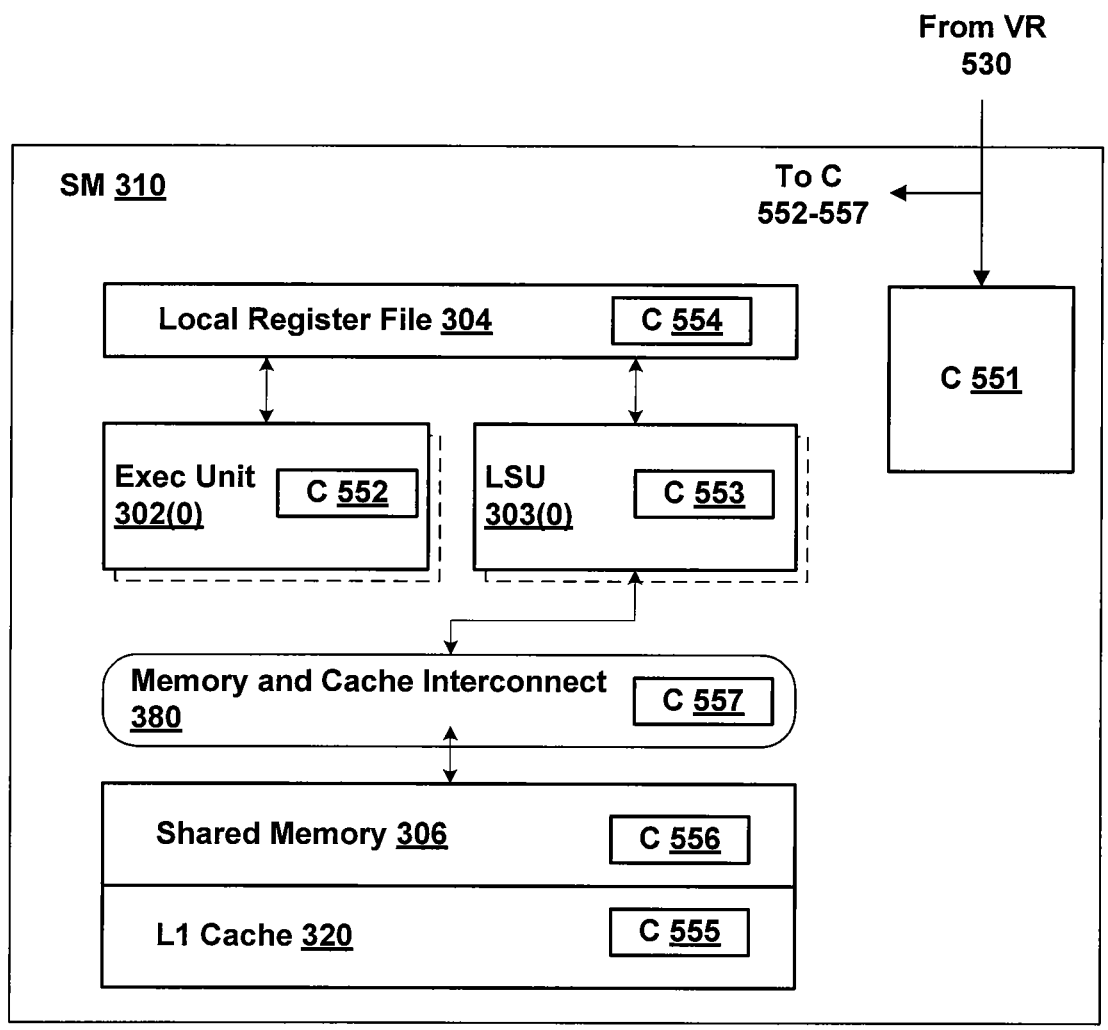
FIG. 5B illustrates streaming multiprocessor of FIG. 5A, according to one example embodiment of the present disclosure.

FIG. 5B illustrates SM 310 of FIG. 5A, according to one example embodiment of the present disclosure. As shown in FIG. 5B, SM 310 includes decoupling capacitor 551, LRF 304, one or more exec units 302, one or more LSUs 303, memory and cache interconnect 380, shared memory 306, and L1 cache 320. SM 310 of FIG. 5B is similar to SM 310 of FIG. 3C and may include some or all of the components shown in FIG. 3C even though such components are not shown explicitly in FIG. 5B. Similar to the function of capacitors 542 and 544 described above in connection with FIG. 5A, decoupling capacitor 551 is configured to compensate for transient load requirements of SM 310 during operation. Decoupling capacitor 551 may be a MOS capacitor implemented within the same silicon substrate as SM 310 and proximate thereto. Decoupling capacitor 551 includes a first contact coupled to a DC power output of voltage regulator 530 and a second contact coupled to ground.

The DC power output of voltage regulator 530 is also coupled to each of the various subunits of SM 310, which may also implement additional decoupling capacitors 552 through 557. Exec Unit 302(0) includes decoupling capacitor 552, LSU 303(0) includes decoupling capacitor 553, LRF 304 includes decoupling capacitor 554, L1 cache includes decoupling capacitor 555, shared memory 306 includes decoupling capacitor 556, and memory and cache interconnect 380 includes decoupling capacitor 557. Each of decoupling capacitors 552 through 557 may be a MOS capacitor implemented within the same silicon substrate as their corresponding units and located proximate thereto, having first and second contacts coupled to the DC power output of voltage regulator 530 and ground, respectively.

It will be appreciated that each of the decoupling capacitors of FIGS. 5A and 5B may or may not be included within the components of graphics card 520, depending on the desired electrical characteristics of the design. Increasing the number/size of capacitors may reduce the required voltage overhead of the power supply, at the expense of cost and complexity. Therefore, designers may perform a cost/benefit analysis of the particular system design, sacrificing energy efficiency for reduced production costs. Alternatively, a system designer may choose to provide fewer decoupling capacitors within the IC, opting instead to implement a power management technique such as instruction throttling to avoid surges in current draw on the supply voltage.

FIGS. 6A-6E are graphs that illustrate instruction throttling techniques implemented by scheduler unit 420, according to one example embodiment of the present disclosure. As described above, each SM 310 of PPU 202 may include one or more warp scheduler and instruction units 312, each coupled to one or more of the functional execution units of SM 310 and configured to schedule the instructions for warps on the functional execution units for execution. The warp scheduler and instruction unit 312 (and, more specifically, the scheduler unit 420 within the warp scheduler and instruction unit 312) may implement an algorithm that prevents a sudden surge in current draw by the functional execution units.

In one embodiment, scheduler unit 420 includes logic that causes the issue rate of instructions to be throttled whenever the current issue rate is substantially above a long term moving average. The throttling rate maintained by the scheduler unit 420 is calculated based on the issue rate for the current scheduling period and a long-term moving average. The issue rate for the current scheduling period is determined by counting the number of clock cycles in which scheduler unit 420 issues at least one instruction. It will be appreciated that in some embodiments, scheduler unit 420 may be able to issue more than one instruction per scheduling period, such as if scheduler unit 420 may issue one instruction from a first warp to a first portion of exec units 302, a second instruction from a second warp to a second portion of exec units 302, and a third instruction to one or more LSU 303. The issue rate may be referred to in units of instructions per scheduling period throughout the present disclosure. In embodiments where scheduler unit 420 may issue more than one instruction in a given clock cycle, the unit of instructions per scheduling period reflects the number of cycles per scheduling period in which one or more instructions was issued by scheduler unit 420.

In one embodiment, the moving average is calculated by adding a product of a decay rate and the issue rate for the current scheduling period to the product of one minus the decay rate and the moving average calculated during the previous scheduling period, such as set forth below in Equation 1. In Equation 1, $A_0$ represents the moving average for the current scheduling period, $I_0$ represents the issue rate for the current scheduling period, D represents a decay coefficient (where the decay rate is equal to D divided by $2^N$, where N is the number of bits of precision used to implement the counters for the scheduling period), and $A_1$ represents the moving average for the previous scheduling period. For example, if D equals 1 and N equals 4, then the issue rate for the current scheduling period, $I_0$, contributes 1/16 to the moving average for the current scheduling period, and the moving average for the previous scheduling period, $A_1$, contributes 15/16 to the moving average for the current scheduling period. Varying the decay coefficient will affect how quickly the moving average reacts to changes in the issue rate. The throttling rate for the current scheduling period is then calculated by adding a throttling offset to the moving average for the current scheduling period. In alternative embodiments, a different calculation may be performed to calculate the moving average, such as by taking an arithmetic mean of the issue rates for the K previous scheduling periods.

$$A_0 = (D/2^N)*I_1 + [(2^N - D)/2^N]*A_1 \qquad (\text{Eq. 1})$$

In one embodiment, the scheduler unit 420 may be configurable by device driver 103. For example, device driver 103 may be programmed to write specific values into special registers of PPU 202 that change the number of clock cycles in a scheduling period, set a minimum throttling rate, or change other default values that affect the operation of scheduler unit 420. One implementation will set the number of clock cycles per scheduling period according to Equation 2, where C represents the number of clock cycles in a scheduling period and N is an integer that reflects the number of bits of precision implemented by the specific throttling algorithm. For example, the scheduling period may be 15 clock cycles (N=4), 255 clock cycles (N=8), or 1024 clock cycles (N=10) providing up to 16, 256, or 1024 discrete levels of throttling, respectively. For purposes of illustration, FIGS. 6A through 6D reflect a scheduling period of 15 clock cycles, but alternative embodiments may set the scheduling period to a larger or smaller number of clock cycles. It will be appreciated that the size of the scheduling period indirectly affects how quickly the scheduler unit 420 is capable of ramping up the processing capacity of SM 310 to 100% efficiency (i.e., issuing one or more instructions per clock cycle).

$$C = 2^N - 1 \qquad (\text{Eq. 2})$$

Figure 6A:
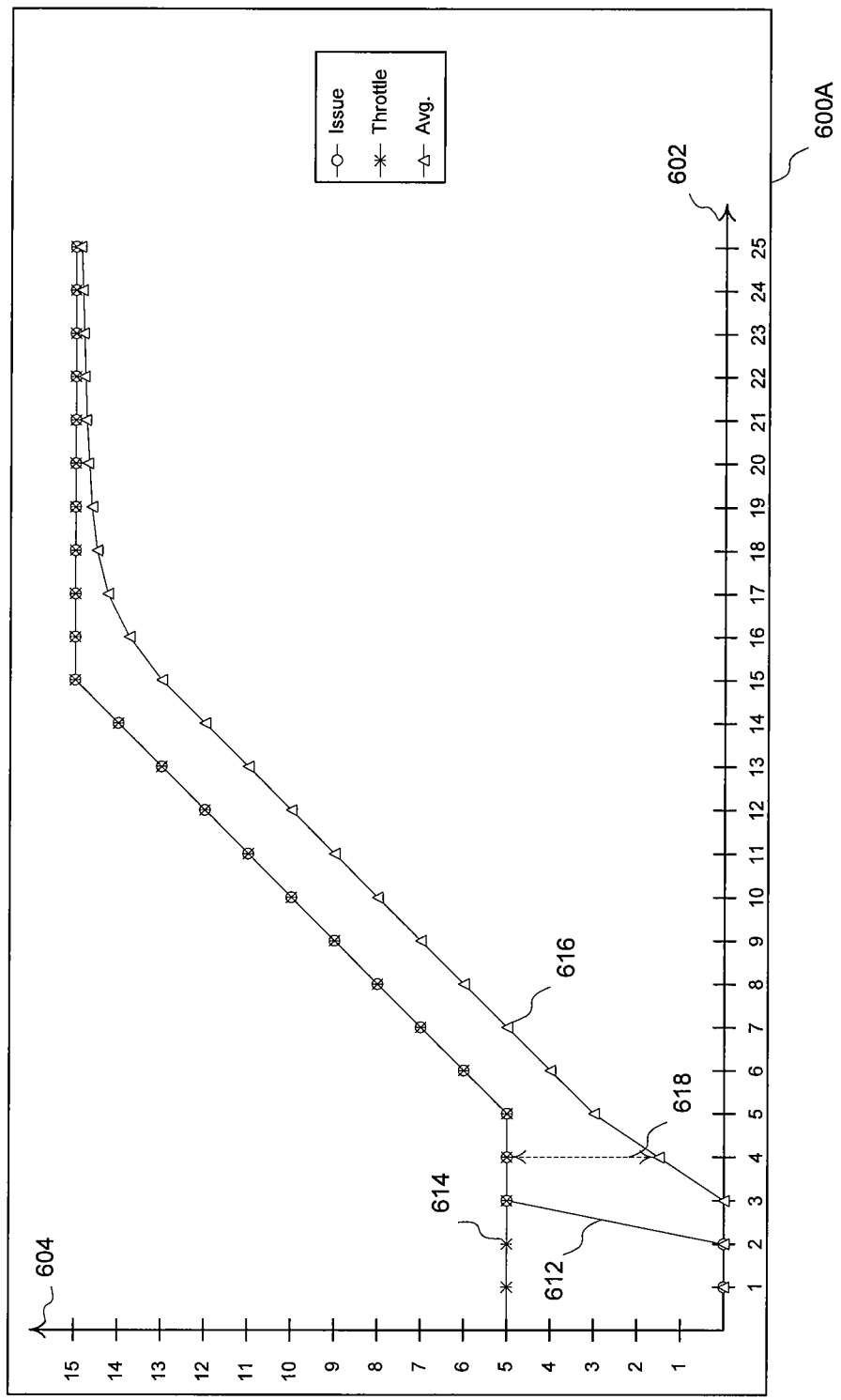
FIGS. 6A-6E are graphs that illustrate the number of instructions issued to the functional execution units per scheduling period, according to one example embodiment of the present disclosure.

As shown in FIG. 6A, a graph 600A is configured with an independent axis 602 that represents discrete scheduling periods (starting at 0 and continuing for 25 consecutive scheduling periods) and a dependent axis 604 that represents the number of instructions issued per scheduling period (from 0 to $2^N - 1$). Three curves are plotted on graph 600A, a first curve 612 that represents the number of issued instructions per scheduling period, a second curve 614 that represents a throttling limit imposed by scheduler unit 420, and a third curve that represents a moving average of instructions issued per scheduling period. In one embodiment, scheduler unit 420 implements a minimum throttling rate that prevents instructions from being throttled whenever the current issue rate is below a threshold level. For example, in FIG. 6A, the second curve 614, which represents the throttling rate of scheduler unit 420, reflects a throttling rate of 5 instructions per scheduling period during the first and second scheduling periods even though the actual issue rate and the long term moving average, reflect an issue rate of 0 instructions per scheduling period. An issue rate of 0 may reflect that SM 310 is currently idle and that there is no pending work being processed by SM 310.

However, during the third scheduling period, SM 310 receives work to be processed by one or more functional execution units of SM 310. The new instructions being issued by scheduler unit 420 are reflected in graph 600A by the jump of the first curve from 0 instructions per scheduling period to 5 instructions per scheduling period. Although SM 310 may have additional work that is capable of being processed during the other 10 clock cycles of the third scheduling period, scheduler unit 420 is configured to throttle the number of issued instructions to prevent SM 310 from creating a large DI/DT spike in DC power 504, allowing SM 310 to instead draw a small additional amount of current from decoupling capacitors 551-557. At the conclusion of each scheduling period, scheduler unit 420 updates the moving average based on the calculated issue rate for the current scheduling period and compares the issue rate during the current scheduling period to the calculated moving average. If the difference 618 between the issue rate and the moving average is below a threshold value, then the throttling rate may be increased by one step size. As shown in FIG. 6A, the throttling rate is increased until scheduling period 15, where the throttling rate equals the maximum issue rate (i.e., one or more instructions issued every clock cycle of the scheduling period).

Figure 6B:
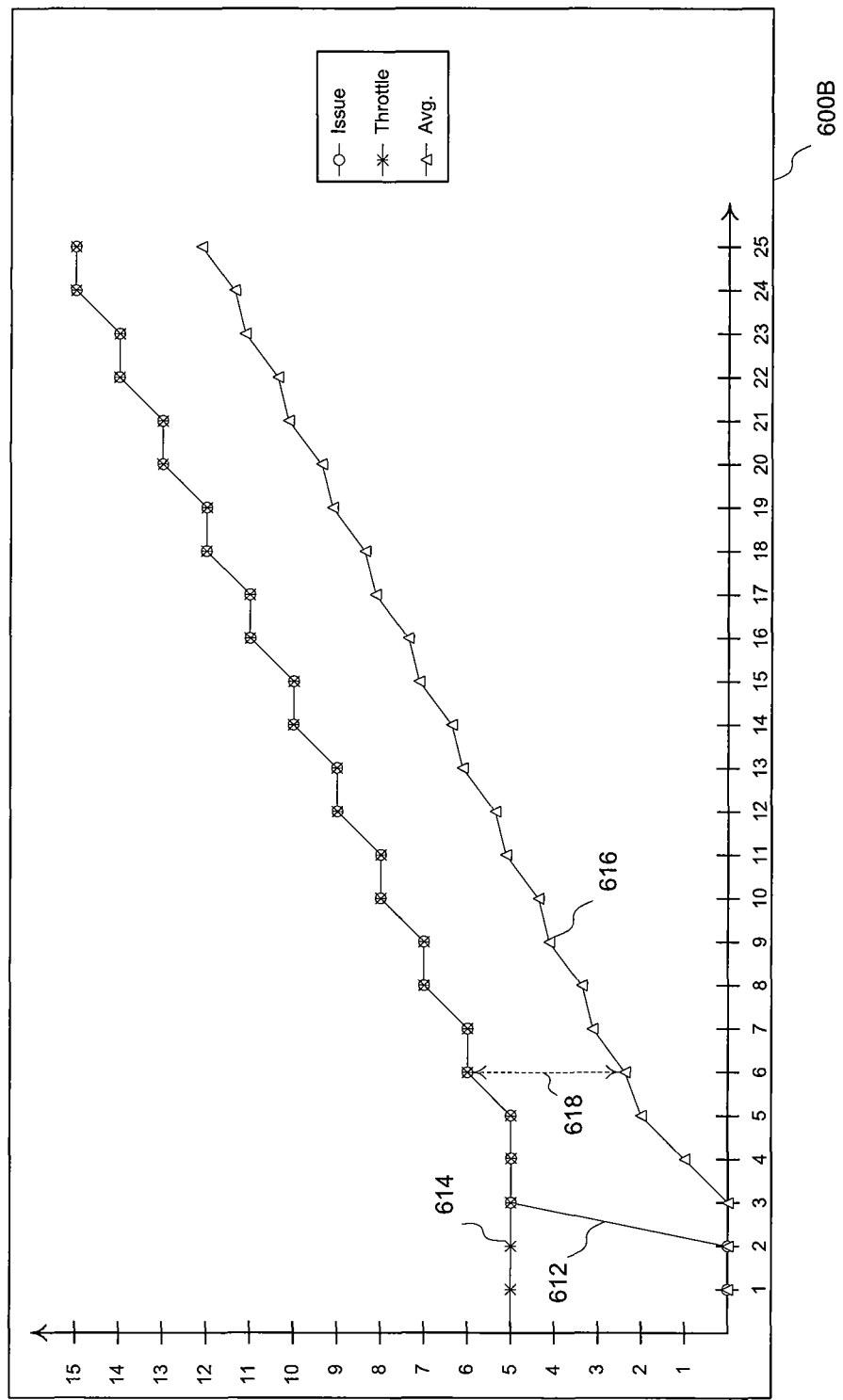

FIG. 6B shows a graph 600B that includes similar curves to FIG. 6A plotted on the same axes. However, the decay coefficient associated with graph 600B is less than 1. Consequently, the moving average (i.e., curve 616) causes the throttling rate to increase one step every other scheduling period. By changing the decay coefficient (e.g., to ½) the ramp speed is decreased, thereby requiring a longer duration to bring SM 310 from idle to the maximum issue rate.

Figure 6C:
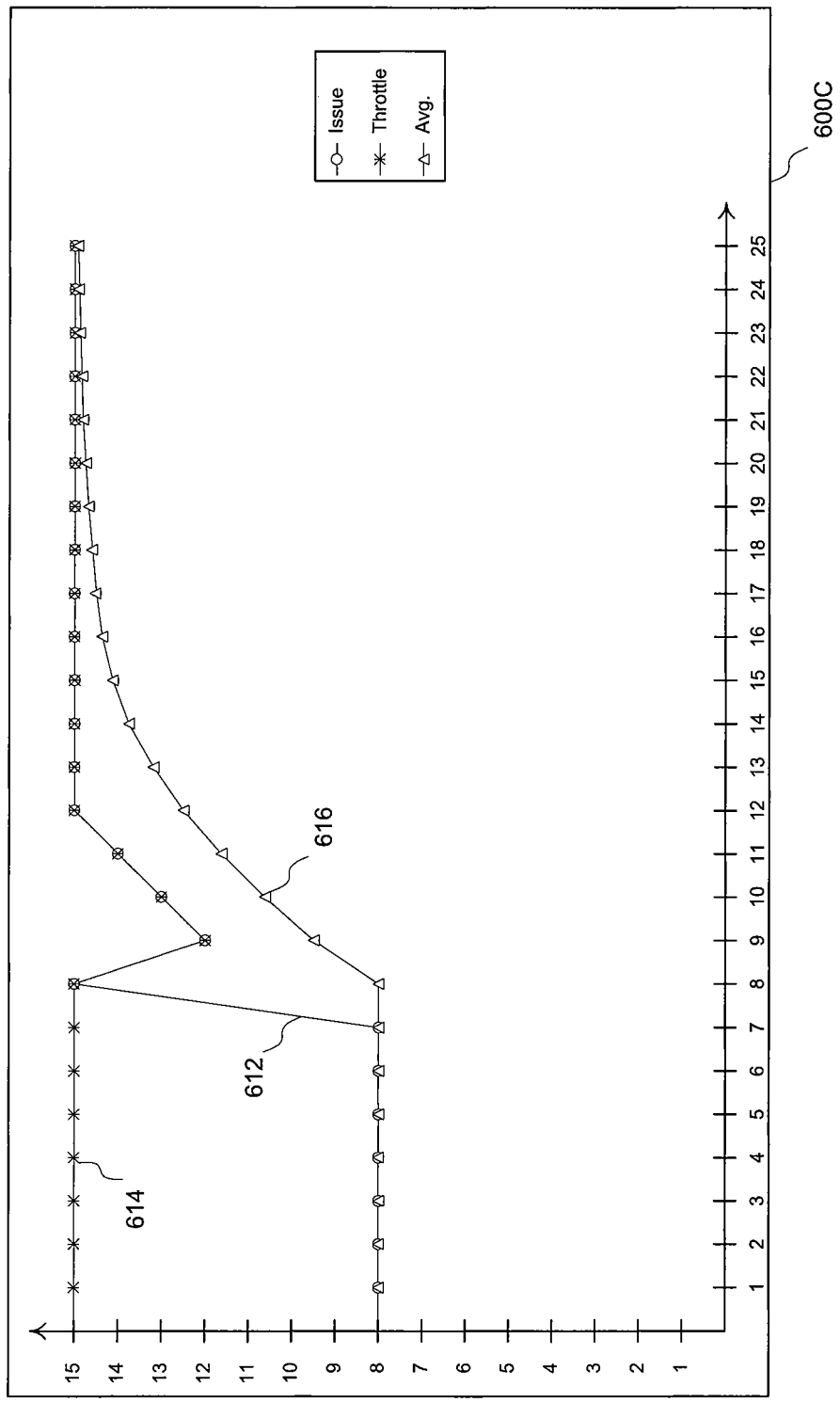

FIG. 6C shows a graph 600C that represents the state of scheduler unit 420 in one possible scenario. Graphs 600A and 600B reflect instruction throttling when the amount of available work ready to be dispatched to the functional execution units is sufficient to issue at least one instruction every clock cycle. However, in some instances, the amount of work scheduled for processing may only be sufficient to issue instructions during a subset of the clock cycles. For example, the curve 612 shows a steady state issue rate during scheduling periods 1-7 of 8 instructions per scheduling period. However, during the 8$^{th}$ scheduling period, SM 310 receives additional work such that scheduler unit 420 could issue instructions during every clock cycle. If instruction throttling was enabled constantly, then the issue rate would only be allowed to increase by the offset difference. While the described operation may prevent a surge in DI/DT, the offset difference may be so small that the incremental change in current draw is not large enough to cause SPMS 510 to increase the duty cycle of the switching mechanism, thereby increasing the amount of power available to the various components of computer system 100. Consequently, as a plurality of components slowly increase the amount of power drawn from the SPMS 510, the decoupling capacitors of SM 310 will drain until the components cause a large voltage drop on the DC power 504 affecting the operation of all other components of computer system 100 until SMPS 510 "reacts" and can correct the supplied voltage level by updating the duty cycle of the control signal.

Figure 6D:
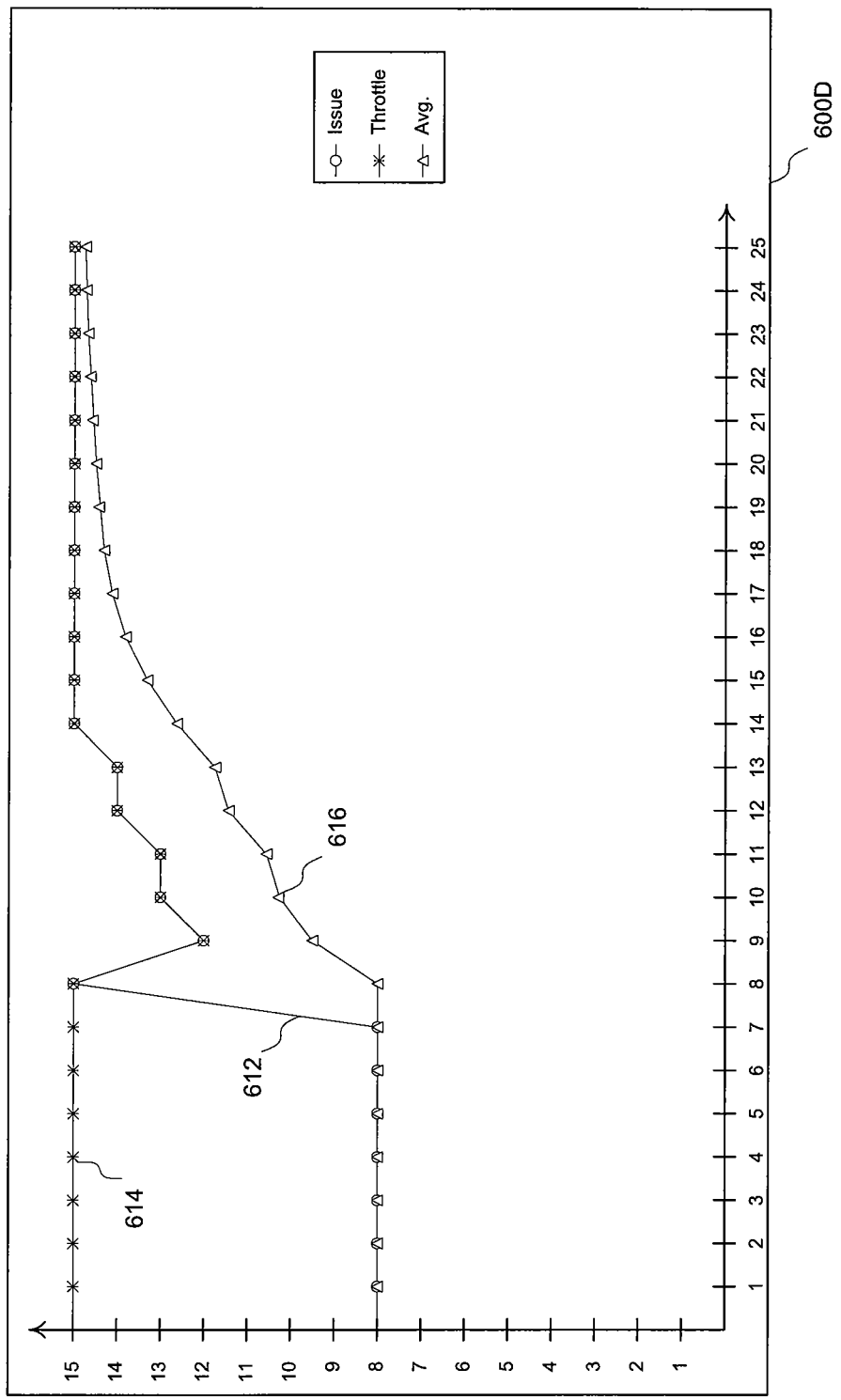

In one embodiment, to avoid disruptions to DC power 504, instruction throttling is disabled temporarily when SM 310 is executing at a steady state issue rate (i.e., where the moving average is constant over a consecutive number of scheduling periods). When additional work causes scheduler unit 420 to issue instructions at a higher issue rate, such that the difference between the issue rate and the moving average is above a threshold trigger distance, throttling is turned on. In one embodiment, scheduler unit 420 may issue instructions at the maximum issue rate for one scheduling cycle. After this scheduling cycle, a new throttling rate is calculated by adding a throttling offset to the moving average for the current scheduling period. Thus, scheduler unit 420 will decrease the issue rate during the next subsequent scheduling period to match the new throttling rate and slowly ramp up to the maximum issue rate as the moving average increases. It will be appreciated that the minimum throttling rate, as shown in FIGS. 6A and 6B, may be set accordingly such that the difference in power draw between SM 310 being idle and SM 310 issuing instructions at the minimum throttling rate will cause a reaction by SPMS 510. FIG. 6D shows a graph 600D, similar to graph 600C, which corresponds to a decay coefficient less than 1.

Figure 6E:
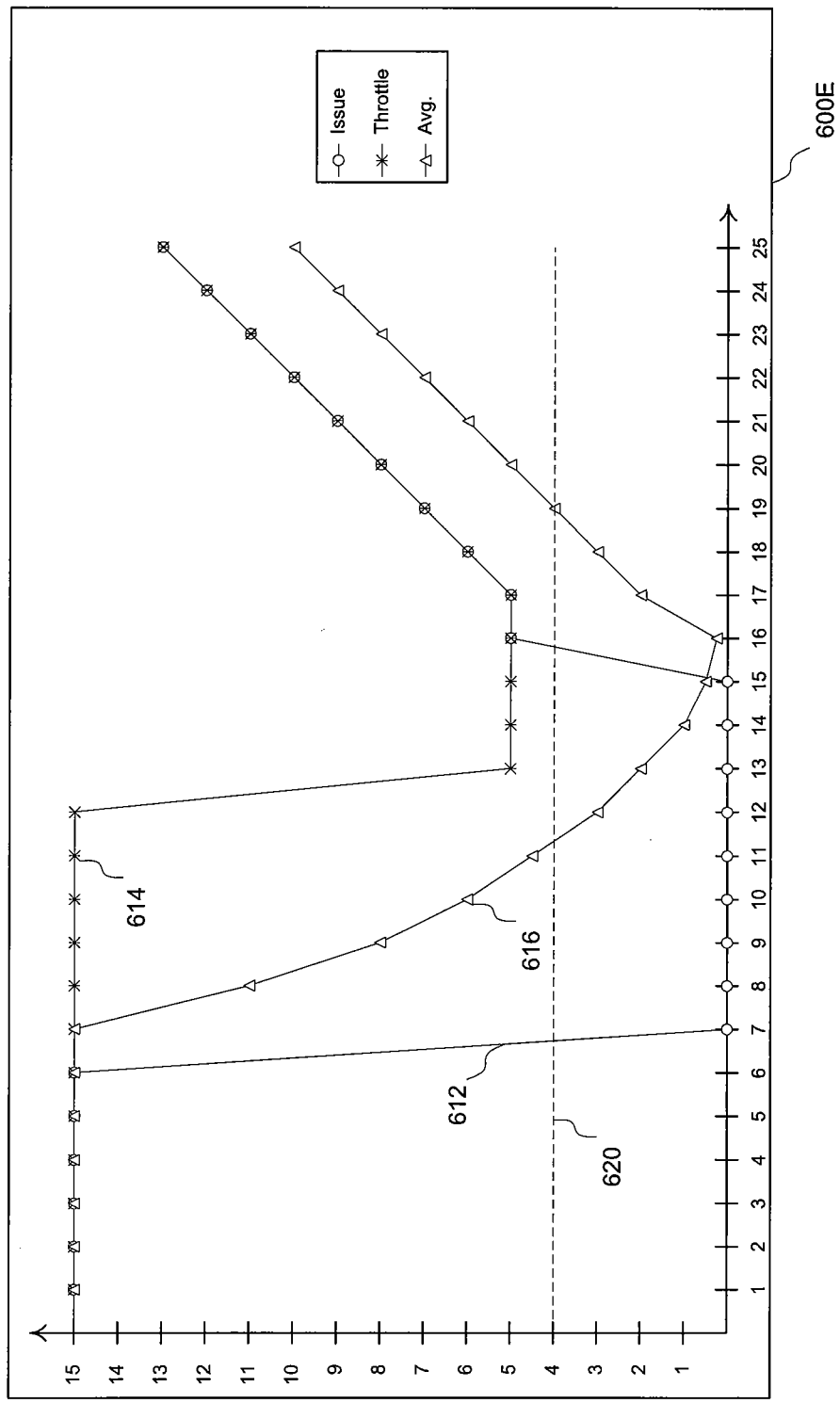

FIG. 6E shows a graph 600E that represents the state of scheduler unit 420 in another possible scenario. Graph 600E reflects how scheduler unit 420 reacts when the issue rate (i.e., curve 612) drops from a maximum issue rate to zero. As shown in FIG. 6E, scheduler unit 420 is issuing instructions at 15 instructions per scheduling period for the first 6 scheduling periods. However, during the seventh scheduling period, the issue rate changes from 15 to 0. For example, SM 310 may complete all pending tasks such that there are no more instructions in the queue waiting to be issued. In one embodiment, instruction throttling (i.e., curve 614) is turned off during steady state operation at the maximum issue rate. As the moving average (i.e., curve 616), drops in reaction to the changing issue rate, the moving average passes a trigger level 620, thereby causing throttling to be turned on. As shown, the moving average drops below 4 instructions per scheduling period during the $12^{th}$ scheduling period. Consequently, throttling is turned on during the $13^{th}$ scheduling period and the throttling rate is set to 5 instructions per scheduling period, the minimum throttling rate. During the $16^{th}$ scheduling period, SM 310 receives more work for processing and scheduler unit 420 dispatches instructions for processing at the throttled issue rate.

It will be appreciated that although FIGS. 1-6E illustrate the components embodied within PPU 202 which may be a graphics processing unit, the techniques and components of these embodiments may also be implemented in other types of processing units such as central processing units having one or more cores or general purpose graphics processing units (GP-GPUs). Other types of processing units are within the scope of the present disclosure.

Figure 7:
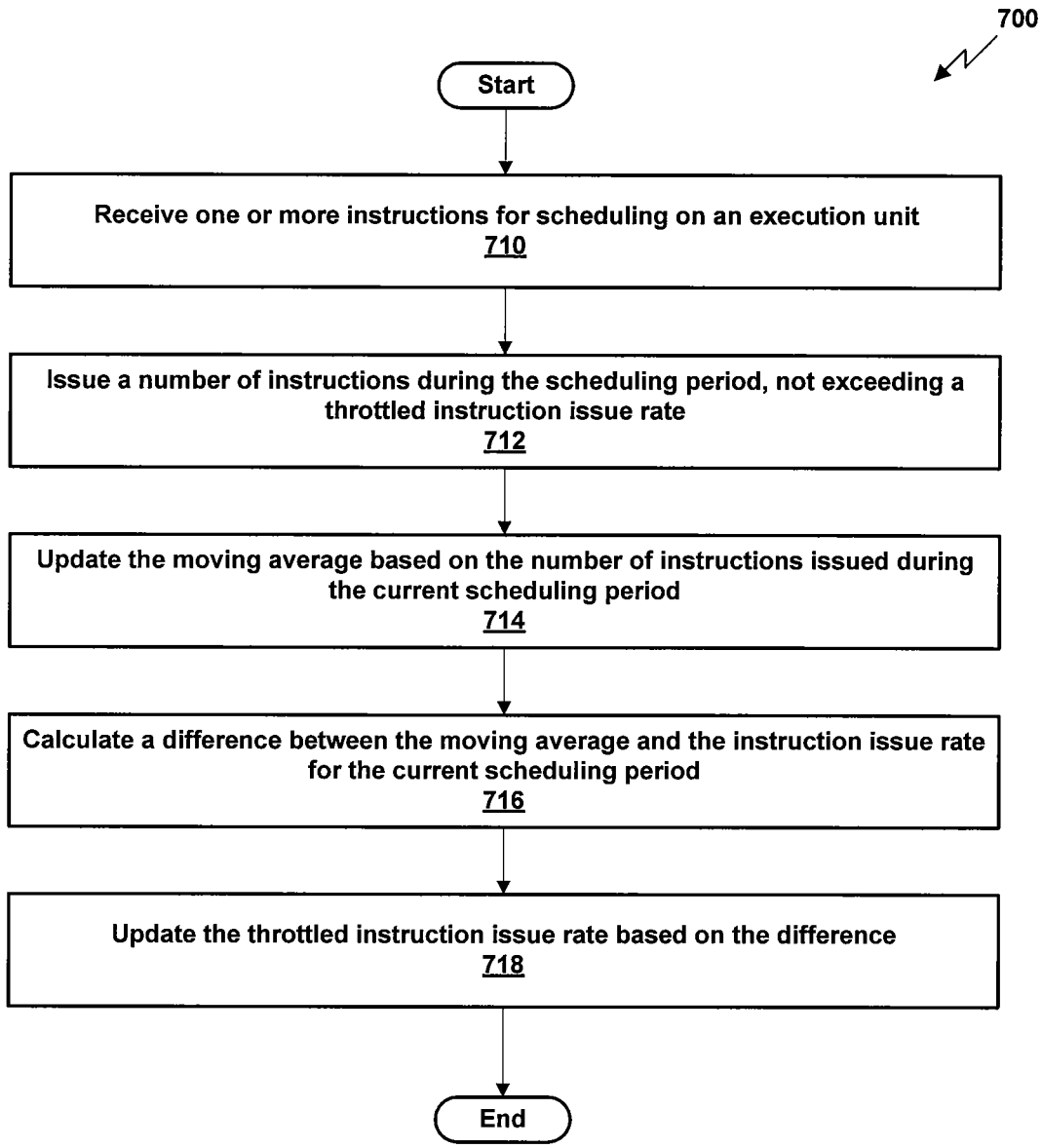
FIG. 7 illustrates a method for throttling the instruction issue rate of a processor to prevent a surge in DI/DT, according to one example embodiment of the present disclosure.

FIG. 7 illustrates a method 700 for throttling the instruction issue rate of a processor to prevent a surge in DI/DT, according to one example embodiment of the present disclosure. Although the method steps are described in conjunction with the systems of FIGS. 1-6, persons of ordinary skill in the art will understand that any system configured to perform the method steps, in any order, is within the scope of the disclosure.

Method 700 begins at step 710, where scheduling unit 420 receives one or more instructions for execution by one or more functional execution units of SM 310. At step 712, scheduling unit 420 issues a number of instructions, the number not to exceed a throttling rate maintained by the scheduling unit 420. In one embodiment, the throttling rate is set equal to the moving average plus an offset value and may be limited to never fall below a minimum threshold value. At step 714, scheduling unit 420 updates the moving average based on the number of instructions issued during the current scheduling period. In one embodiment, the moving average is updated according to Equation 1, set forth above.

At step 716, scheduling unit 420 calculates a difference between the moving average and the instruction issue rate for the current scheduling period. At step 718, scheduling unit 420 updates the throttling rate based on the difference. If the difference is below the trigger value, then the scheduling unit 420 updates the throttling rate by increasing the throttling rate by one step size. In one embodiment, the step size is equal to one instruction per scheduling period. However, if the difference is greater than or equal to the trigger value, then scheduling unit 420 updates the throttling rate by setting the throttling rate equal to the moving average plus an offset value. After step 718, method 700 terminates.

It will be appreciated that steps 710 through 718 may be repeated for successive scheduling periods, thereby continuously updating the throttled issue rate and allowing the SM 310 to ramp up processing capacity from idle to the maximum issue rate.

In sum, a processor includes one or more execution units coupled to a scheduling unit that is configured to select a number of instructions for execution by the one or more execution units during a given scheduling period. The execution units may be connected to one or more decoupling capacitors that store a small amount of incremental power for the circuits of the execution units. The scheduling unit is configured to throttle the instruction issue rate of the execution units to prevent surges in DI/DT. A moving average of the number of instructions issued during a scheduling period is maintained. The number of instructions issued during the current scheduling period is set less than or equal to a throttling rate that is greater than or equal to a minimum throttling issue rate. Otherwise, the throttling rate is set equal to the moving average plus an offset value.

One advantage of the disclosed system is that by throttling the issue rate of instructions on the processor, a small decoupling capacitor is capable of handling any sudden increase in power drawn by the processor. Therefore, the voltage overhead required to maintain reliable operation of the processor is reduced. This allows the processor to be run at higher clock frequencies or to be supplied power at more energy efficient voltage levels.

The disclosure has been described above with reference to specific embodiments. Persons of ordinary skill in the art, however, will understand that various modifications and changes may be made thereto without departing from the broader spirit and scope of the disclosure as set forth in the appended claims. The foregoing description and drawings are, accordingly, to be regarded in an illustrative rather than a restrictive sense.

What is claimed is:

1. A computer-implemented method for throttling an instruction issue rate of a processor, the method comprising:
   receiving a plurality of instructions to be issued to one or more execution units within the processor;
   dispatching a subset of instructions included in the plurality of instructions to the one or more execution units within a first number of clock cycles during a current scheduling period, wherein the instruction issue rate during the current scheduling period is defined by a number of clock cycles for which at least one instruction is dispatched, and wherein the instruction issue rate during the current scheduling period is less than or equal to a throttling rate for the current scheduling period;
updating a moving average based on the instruction issue rate during the current scheduling period; and
updating a throttling rate for a next scheduling period based on the moving average.

2. The method of claim 1, wherein the instruction issue rate is equal to the number of clock cycles during the current scheduling period in which at least one instruction was dispatched to the one or more execution units.

3. The method of claim 2, wherein each scheduling period comprises a number of clock cycles corresponding to the number of bits of precision used to determine the instruction issue rate.

4. The method of claim 1, wherein updating the moving average comprises adding the product of a decay rate and the instruction issue rate to the product of one minus the decay rate and the moving average.

5. The method of claim 1, wherein updating the moving average comprises calculating an arithmetic mean of instruction issue rates for two or more previous scheduling periods as well as the instruction issue rate for the current scheduling period.

6. The method of claim 1, wherein the throttling rate is greater than or equal to a minimum throttling rate and less than or equal to a maximum instruction issue rate associated with the processor.

7. The method of claim 6, wherein updating the throttling rate comprises:
calculating a difference between the throttling rate and the moving average; and
if the difference is less than a trigger value, then increasing the throttling rate by one step size, or
if the difference is greater than or equal to the trigger value, then setting the throttling rate equal to a sum of the moving average and an offset value.

8. The method of claim 1, further comprising:
determining whether the moving average is constant for a threshold number of consecutive scheduling periods; and
if the moving average is not constant for a threshold number of consecutive scheduling periods, then restricting the instruction issue rate during the next scheduling period based on the updated throttling rate for the next scheduling period, or
if the moving average is constant for a threshold number of consecutive scheduling periods, then disabling throttling the instruction issue rate of the processor by allowing the instruction issue rate during the next scheduling period to exceed the updated throttling rate for the next scheduling period.

9. A processing unit that includes one or more execution units for throttling an instruction issue rate of the processor according to a throttling rate, comprising:
a scheduler configured to:
receive one or more instructions to be issued to the one or more execution units,
dispatch a subset of instructions included in the one or more instructions to the one or more execution units within a first number of clock cycles during a current scheduling period, wherein the instruction issue rate during the current scheduling period is defined by a number of clock cycles for which at least one instruction is dispatched,
update an average of instructions issued based on the instruction issue rate during the current scheduling period, and
update the throttling rate for a next scheduling period based on the average of instructions issued.

10. The processor of claim 9, wherein the instruction issue rate is equal to the number of clock cycles during the current scheduling period in which at least one instruction was dispatched to the one or more execution units.

11. The processor of claim 10, wherein each scheduling period comprises a number of clock cycles corresponding to the number of bits of precision used to determine the instruction issue rate.

12. The processor of claim 9, wherein updating the average of instructions issued comprises adding the product of a decay rate and the instruction issue rate to the product of one minus the decay rate and the average of instructions issued.

13. The processor of claim 9, wherein updating the average of instructions issued comprises calculating an arithmetic mean of instruction issue rates for two or more previous scheduling periods as well as the instruction issue rate for the current scheduling period.

14. The processor of claim 9, wherein the throttling rate is greater than or equal to a minimum throttling rate and less than or equal to a maximum instruction issue rate associated with the processor.

15. The processing unit of claim 14, wherein updating the throttling rate comprises:
calculating a difference between the throttling rate and the average of instructions issued; and
if the difference is less than a trigger value, then increasing the throttling rate by one step size, or
if the difference is greater than or equal to the trigger value, then setting the throttling rate equal to a sum of the average of instructions issued and an offset value.

16. A computing device for throttling an instruction issue rate of a processor according to a throttling rate, comprising:
a memory; and
a processor coupled to the memory and including one or more execution units and a scheduler coupled to the one or more execution units, wherein the scheduler is configured to:
receive one or more instructions to be issued to the one or more execution units,
dispatch a subset of instructions included in the one or more instructions to the one or more execution units within a first number of clock cycles during a current scheduling period,
update the throttling rate for a next scheduling period based on the instruction issue rate during the current scheduling period.

17. The computing device of claim 16, wherein the processor comprises a streaming multi-processor that includes a plurality of execution units.

18. The computing device of claim 16, further comprising a switched mode power supply configured to generate a DC supply voltage.

19. The computing device of claim 18, wherein the processor includes at least one decoupling capacitor connected to the DC supply voltage.

20. The computing device of claim 16, wherein updating the throttling rate comprises:

calculating a difference between the throttling rate and an average of instructions issued; and if the difference is less than a trigger value, then increasing the throttling rate by one step size, or if the difference is greater than or equal to the trigger value, then setting the throttling rate equal to a sum of the average of instructions issued and an offset value.

* * * * *